United States Patent Office

3,431,287
Patented Mar. 4, 1969

3,431,287
PROCESS FOR THE PREPARATION OF 2-HYDROXYMETHYLENE-19-NOR-STEROIDS
Max Salomon de Winter, Oss, Netherlands, assignor to Organon Inc., West Orange, N.J., a corporation of New Jersey
No Drawing. Filed Dec. 28, 1966, Ser. No. 605,181
Claims priority, application Netherlands, Jan. 15, 1966, 6600548
U.S. Cl. 260—397.4      4 Claims
Int. Cl. C07c *169/22, 169/34, 171/06*

ABSTRACT OF THE DISCLOSURE

According to the present process 2-hydroxymethylene-19-nor-steroids are obtained by reaction of a $\Delta^4$-3-keto-10-formyl-steroid with an alkalimetal salt of a tertiary alcohol. This process is shorter and provides higher yields than the known process consisting in the reaction of a $\Delta^4$-3-keto-19-nor-steriod with an alkyl formate in the presence of a strong base.

The respective end-products are important both on account of their biological properties and as intermediates for the preparation of other steroid derivatives.

---

The invention relates to a process for the manufacture of $\Delta^4$-3-keto - 2 - hydroxymethylene-19-nor steroids. It is known to prepare a 2-hydroxymethylene-$\Delta^4$-3-keto-19-nor-steroid by reacting the corresponding in 2-position unsubstituted $\Delta^4$-3-keto-19-nor-steroid with an alkylformate in the presence of a strong base, such as sodiumhydride.

A new process has now been found for the manufacture of $\Delta^4$-3-keto-2-hydroxymethylene-19-nor-steroids consisting in that a $\Delta^4$-3-keto-10-formyl-steroid is reacted with an alkali metal salt of a tertiary alcohol, causing the conversion, intramolecularly, of the 10-formyl-group to position 2 of the molecule.

The result of the process according to the invention is most surprising, because it might at best be expected that only the elimination of the 10-formyl group would occur while forming the corresponding $\Delta^4$-3-keto-19-nor-steroid.

The present process has some great advantages over the known methods. First the synthesis is shorter, because an in 10-position oxygenated androstane compound can be taken as starting material, the known methods requiring the use of a 19-nor-steroid as starting material. Moreover the present method provides higher yields, not only because of its shorter route, but also because the introduction of the 2-hydroxymethylene group as such gives a higher yield.

The starting products in the process according to the invention can be prepared by oxidizing a $\Delta^5$-acyloxy-steroid by conventional methods via the 5$\alpha$-bromo-6$\beta$-hydroxy compound with an oxidizing metal acylate to the corresponding 6,19-oxido compound, and converting the 3-acyloxy group by hydrolysis and oxidation into the 3-keto group, followed by the elimination of the 5-bromo substituent as HBr, for instance with pyridine, while forming a double bond between the carbon atoms 4 and 5, and finally by cleaving the 6,19-oxido ring by reaction with, for example zinc and acetic acid, to obtain the $\Delta^4$-3,19-dioxo-(10-formyl)-steroid after oxidation of the 19-hydroxy compound formed.

The starting products may belong to the androstane, pregnane, cholane, furostane or other series, and may be both homo and nor-steroids, including 18-nor. Further they may be substituted elsewhere in the molecule by one or more alkali resistent groups. An important group of starting products are the $\Delta^4$-3,19-dioxo-steroids of the androstane or pregnane series.

The process is usually performed by dissolving the relative steroid in an organic solvent and adding this solution to a mixture of an alkali metal-t. alcoholate and the corresponding tertiary alcohol. The alkali metal is preferably potassium, and as tertiary alcohol t-butanol is preferably used. The quantity of steroid relating to the quantity of alkali metal may vary from 1:2 to 1:50 molar.

The mixture described before is stirred for some time at a certain temperature, after which the desired final product can be isolated, for example by pouring out into acetic acid.

The reaction temperature is preferably between 10 and 50° C., and the reaction period is usually from 5 minutes to a few hours.

The thus obtained $\Delta^4$-3-keto-2-hydroxymethylene-steroids are important as such on account of their biological properties, but they may also serve as intermediate product for the manufacture of other valuable steroids, i.e. of ring A condensated heterocyclic ring systems, or of the corresponding $\Delta^{1,3,5(10)}$-2-formyl-3-hydroxy-oestratriene compounds, which are obtained by chemical or microbiological 1,2-dehydrogenation of the $\Delta^4$-3-keto-2-hydroxymethylene-steroids.

As regards the manufacture of 2-formyl-oestratrienes, the present process has further the advantage that only 2-formyl-steroids are obtained, while the known methods yield mixture of in 2 and/or 4-position substituted compounds.

The invention is further illustrated by the following examples:

Example I 59 gm. of potassium were dissolved in 1200 ml. of t. butanol, to which were slowly added at room temperature and in nitrogen atmosphere a solution of 45 gm. of $\Delta^4$-3,17,19-trioxo-androstene in 120 ml. of tetrahydrofuran. After 20 minutes the reaction mixture was pressed with nitrogen into an excess of 2 N acetic acid while cooling with ice, After that the mixture was neutralised with potassium bicarbonate and extracted with mehylene chloride. The extract was washed with water, and evaporated to dryness. The residue was crystallized from methanol to obtain the $\Delta^4$-2-hydroxymethylene-3,17-diketo-oestrene (melting point 150–154° C.; $[\alpha]^{20}_D = +218°$ (c.=1; chloroform)).

Example II

A solution of 4 gm. of $\Delta^4$-3,17,19-trioxo-androstene in 10 ml. of tetrahydrofuran were slowly added to a solution of 3 gm. potassium in 100 ml. of t. amylalcohol at 40° C.

The processing took place by the process described in Example I to obtain the $\Delta^4$-2-hydroxymethylene-3,17-diketo-oestrene.

In an analogous manner $\Delta^4$-3-19-dioxo-16$\alpha$-methyl-17$\beta$-benzoyloxy-androstene and $\Delta^4$-3,19-dioxo-17$\beta$-benzoyloxy-androstene have been converted into the corresponding 2-hydroxymethylene-19-nor-compounds.

Example III 2.3 gm. of potassium were dissolved in 100 ml. of t. amylalcohol to which was added at room temperature and in nitrogen atmosphere a solution of 3,3 gm. of $\Delta^4$-3,19,20-trioxo-pregnene in tetrahydrofuran, after which the reaction mixture was processed by the process described in Example I to obtain the $\Delta^4$-2-hydroxymethylene-3,20-diketo-19-nor-pregnene in a yield of 54%.

In the same manner $\Delta^4$-3,19-dioxo-20-benzoyloxy-pregnene and $\Delta^4$-3,19,20-trioxo-16$\alpha$-ethyl-pregnene have been converted into the corresponding 2-hydroxymethylene-19-nor-pregnene compounds.

Example IV

A mixture of 6 gm. of 19-oxo-cholestenone in 50 ml.

of diethylether was slowly added to a solution of 12 gm. of sodium in 400 ml. of t. butanol in nitrogen atmosphere. This reaction-mixture was treated by the process as described in Example I to obtain 2-hydroxymethylene-19-nor-cholestenone.

What is claimed is:

1. Process for the manufacture of $\Delta^4$-3-keto-2-hydroxymethylene-19-nor-steroids, characterized in that a $\Delta^4$-3-keto-10-formyl-steroid is reacted with an alkali metal salt of a tertiary alcohol.

2. Process according to claim 1, characterized in that as reagent a mixture of the alkali metal alcoholate and the corresponding tertiary alcohol is employed.

3. Process according to claim 2, characterized in that potassium-t. butylate and t. butanol are employed.

4. Process according to claim 1, characterized in that the starting-products are $\Delta^4$-3,19-dioxo-steroids of the androstane and pregnane series.

References Cited

UNITED STATES PATENTS 3,247,189   4/1966   Wettstein et al.

OTHER REFERENCES

Ringold et al., J.A.C.S. vol. 81, January 1959, 427–431.

LEWIS GOTTS, *Primary Examiner.*

D. G. RIVERS, *Assistant Examiner.*

U.S. Cl. X.R.

260—397.2, 397.3, 239.55